Patented Apr. 12, 1949

2,467,171

UNITED STATES PATENT OFFICE 2,467,171

PREPARATION OF GLYCIDYL POLYETHERS OF POLYHYDRIC AROMATIC ALCOHOLS

Ernest George Germain Werner and Evert Farenhorst, Amsterdam, Netherlands, assignors to Shell Development Company, San Francisco, Calif., a corporation of Delaware No Drawing. Application June 18, 1948,
Serial No. 33,914
In the Netherlands August 1, 1947

8 Claims. (Cl. 260—348)

This invention relates to the production of glycidyl polyethers of polyhydric aromatic alcohols. More particularly the invention provides a practical method of preparing such ethers as isolatable individual compounds whereas they have heretofore been produced only as transitory intermediates in the formation of polymers and condensation products.

Certain glycerol halohydrins contain a functional group similar to that of an alkyl halide and are known to react with certain hydroxy compounds in an analogous manner. For example, U. S. Patent No. 2,221,818 describes and claims the preparation of epoxyalkyl ethers of alkyl phenols by a reaction analogous to the Williamson synthesis. By the process of the patent equimolar amounts of 4-tertiary-octylphenol and sodium hydroxide were added to about an equimolar amount of 1-chloro-2,3-epoxypropane (epichlorohydrin). As in the Williamson synthesis sodium chloride was precipitated and an ether, 4-tertiary-octylphenyl glycidyl ether, was formed.

The term "glycerol halohydrin" has been employed by the authors of chemical texts to refer to halo derivatives of glycerol including, 1,2,3-trichloropropane; 1,3-dihydroxy-2-chloro- and 1,2-dihydroxy-3-chloropropane; 1,3-dichloro-2-hydroxy- and 1,2-dichloro-3-hydroxypropane, as well as 1-chloro-2,3-epoxypropane. The present invention is, however, solely concerned with the monoxy glycerol halohydrins consisting of 1-chloro-2,3-epoxypropane (epichlorohydrin) and the isomers 1,3-dichloro-2-hydroxy- and 1,2-dichloro-3-hydroxypropane (dichlorohydrins), as well as the corresponding bromo compounds. The monoxy glycerol halohydrins are each capable of reacting under alkaline conditions with alcohols to produce glycidyl ethers. In the case of epichlorohydrin, for example, 1 mole of hydrogen chloride is released for each glycidyl radical which attaches to hydroxyl oxygen atoms, while in the case of the dichlorohydrins, for example, 2 moles are so released (1 mole being released in forming the epoxide group).

In general an alkyl halide will react to produce polyethers in the same manner when an amount of the halide approximately equal to the number of moles of a polyhydroxy compound multiplied by the number of hydroxyl groups it contains is contacted under similar conditions with the polyhydroxy compound and an alkali. However, an entirely different result is obtained when a monoxy glycerol halohydrin is employed under similar conditions. The monoxy glycerol halohydrins are themselves polyfunctional compounds containing in the case of epichlorohydrin an epoxyethyl group

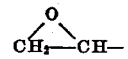

and in the case of the dihalohydrins a hydroxy group and a second halogen atom each of which can undergo etherification reactions under the stated conditions. Although it would seem that side reactions would be inhibited by employing a bare equivalent or less of the halo derivative, it has been found that such procedures lead to the occurrence of polymerization and condensation reactions as the predominant reactions. U. S. Patent No. 2,324,483 is directed to the preparation of thermosetting resins by reacting a polycarboxylic acid anhydride with the product of reaction in alkaline solution of a polyhydroxyphenol and epichlorohydrin. The patent teaches that such products of reaction are prepared by the use of substantially equivalent amounts of chlorohydrin based on the hydroxide equivalents of the phenol. The character of the products of reaction so obtained is illustrated by the reaction of an equivalent amount of sodium hydroxide and 2,2-bis(4-hydroxyphenyl)propane with epichlorohydrin in a mole ratio of substantially 1 to 2 (the stoichiometric equivalent of chlorohydrin based on the hydroxyl content). The reaction product was described as a soft resin which becomes increasingly hard as the reaction progressed.

The glycidyl polyethers of polyhydric aromatic alcohols are even in the monomeric state high boiling and somewhat viscous liquids, or in many cases, solids. Thus, although by a careful control of the reaction between a polyhydroxylaryl compound and a monoxy glycerol halohydrin in an alkaline solution in some cases up to about 10% of the monomeric ethers may be produced (illustrated by Example II), their separation from the reaction is attended with difficulty. In addition to the viscous character of the mixture of reaction products they will polymerize or condense with almost explosive rapidity if, for example, during a vacuum distillation to remove the monomeric ethers, the solution is allowed to increase in alkalinity.

A principal object of the invention is to provide a process for the production of monomeric glycidyl polyethers of polyhydric aromatic alcohols embodying a procedure which inhibits the occurrence of polymerization and condensation reactions. A further object is to provide a method of preparing a novel class of diastereomeric compounds having valuable properties in widely divergent applications. Still other objects and advantages will be apparent from the following description of the invention.

We have now surprisingly discovered that a certain class of polyhydroxy aromatic compounds react in the presence of an inorganic alkaline reacting compound and a monoxy glycerol halohydrin to form monomeric compounds as the principal reaction products when the halohydrin is employed in an excess amounting to at least twice the number of moles of the hydroxy compound multiplied by the number of hydroxyl groups it contains. Additional advantageous conditions are (1) the addition of the alkaline reacting compound throughout the course of the reaction so that the alkalinity of the reaction mixture is maintained at less than that causing phenolphthalein to change in color and (2) conducting the reaction in an essentially oxygen-free atmosphere.

The class of polyhydroxy aromatic compounds which are suitable for employment in the present process will be referred to throughout the specification and appended claims as "polyhydroxyaryl-hydrocarbons." The polyhydroxyaryl-hydrocarbons are hydrocarbons, containing at least one benzene ring and at least two substituent hydroxyl groups attached to non-adjacent carbon atoms in the benzene rings. Illustrative examples of this class of compounds include polyhydric phenols such as resorcinol, hydroquinone and phloroglucinol; polyhydric aromatic compounds with condensed ring systems such as 1,4-dihydroxylnaphthalene, 9,10-dihydroxyanthracene and 1,3,6-trihydroxynaphthalene; and polyhydric aromatic compounds with separated rings such as 4,4-dihydroxydiphenyl, 2,2-bis(4-hydroxyphenyl)propane and 1,4-bis(4-hydroxyphenyl)cyclohexane.

We have found that polyhydric aromatic compounds containing vicinal hydroxyl groups, i. e., two or more hydroxyl groups attached to adjacent carbon atoms of a benzene ring (such as catechol, pyrogallol and hydroxyhydroquinone) produce a different class of compounds when employed in the reaction process of the present invention. In contrast to the defined compounds containing hydroxyl groups attached to non-adjacent carbon atoms, the vicinally substituted compounds through a ring closure produce derivatives of dioxane. Their employment in the production of epoxyalkyl aryl polyethers is therefore not contemplated in the present invention.

We have found that a preferred subclass of polyhydroxyaryl-hydrocarbons for employment in the present process consists of aromatic hydrocarbons containing not more than two uncondensed benzene rings and containing two substituent hydroxyl groups attached to non-adjacent carbon atoms in the rings. Typical examples of the preferred starting compounds are hydroquinone, resorcinol and 2,2-bis(4-hydroxyphenyl)propane.

A preferred subclass of monoxy glycerol halohydrins comprise the chloro compounds including epichlorohydrin and the isomeric dichlorohydrins, of which chloro compounds epichlorohydrin is particularly suitable.

The inorganic alkaline reacting compounds which are suitable for employment in the present process are preferably water soluble compounds such as the alkali or alkaline earth metal hydroxides; the alkali metal carbonates, and the like. It has been found most convenient to use the alkali metal hydroxides, and their use in the form of an aqueous solution of any convenient concentration is a particularly preferred mode of conducting the process. However, the alkaline reacting compound may be employed in the solid form, or in the form of a suspension which may be an aqueous slurry or a suspension of the compound in an inert organic solvent, for example, in a liquid hydrocarbon such as pentane, or an oxygenated solvent such as acetone or methyl ethyl ketone.

It is preferable to employ substantially the stoichiometric amount of the inorganic alkaline reacting material to neutralize the hydrogen halide released by the etherification reaction, and where a dihalohydrin is employed, to neutralize that formed by the removal of hydrogen halide from the halohydrin radical to form the epoxyethyl group in addition to that released by the etherification reaction. The presence in the reaction mixture of substantially more than the stoichiometric amount of the alkaline reacting compound tends to increase the rate of side reactions and is to be avoided. Similarly, the presence of an excess of alkaline reacting material in the reaction products after the completion of the reaction tends to cause further reactions such as condensation and polymerization to occur during the separation of the mixture. The preferred methods of adding the alkaline material therefore embody its introduction throughout the course of the reaction in small amounts as required to maintain the alkalinity of the reaction mixture between about the neutral point and the alkalinity causing a color change in phenolphthalein.

Surprisingly, the presence of an excess of the monoxy glycerol halohydrin in the reaction mixture is critical in the present process. For example, when epichlorohydrin is employed in accordance with the process of the invention with a dihydroxyphenol in a molar ratio of at least 4 to 1 monomeric diglycidyl ethers are obtainable in yields of 70% or more, whereas when equivalent amounts of epichlorohydrin (a molar ratio of 2 to 1) are employed, polymerization and condenstion products comprise 90% or more of the reaction products. It is therefore preferred to employ the glycerol halohydrin in a molar excess corresponding to from 2 to 3 times the number of moles of polyhydroxyaryl-hydrocarbon times the number of hydroxyl groups it contains. A larger excess of the glycerol halohydrin may be employed but such excess results in but little improvement in the yield.

The employment of the halohydrins in excess has an additional advantage in that the reaction is conducted in a reaction medium essentially comprising a monoxy glycerol halohydrin. Such halohydrins are in general excellent solvents for the polyhydroxyaryl-hydrocarbons, thus the present process is not dependent upon physical properties of the polyhydroxyaryl-hydrocarbons, for example, it is not necessary that they be liquid at normal temperatures or the temperature of the reaction, and polyhydroxyaryl-hydrocarbons of up to about 30 carbon atoms may suitably be employed in the process.

The process is conducted at moderately elevated temperatures, in general temperatures from room temperature to about 120° C., being preferred. In the reaction of epichlorohydrin with a dihydroxyaryl-hydrocarbon particularly suitable yields have been obtained at temperatures of from 50° C. to 110° C. Although increasing the reaction temperature generally increases the rate of a chemical reaction, in the present process increasing the temperature to substantially above about 120° C. causes increasing losses of the halohydrin through hydrolysis reactions therefore no particular advantage is gained by the employment of temperatures above about 120° C.

It is most economical and is generally preferred to conduct the present process under atmospheric pressure. However, where it is practical or desirable greater or lesser pressures may suitably be employed.

We have found that an absence of gaseous oxygen in the atmosphere in which the reaction is conducted tends to inhibit the occurrence of undesired side reactions. The process is preferably conducted under an atmosphere of nitrogen, carbon dioxide or similar inert oxygen-free gases or gaseous mixtures.

The glycidyl polyethers of polyhydric aromatic alcohols by virtue of the presence of an asymmetric carbon atom in each of the glycidyl radicals exist as diastereo isomers. In many cases the differences in physical properties are pronounced and the individual isomers may be isolated by fractional distillation or fractional crystallization.

The individual glycidyl polyethers are valuable compounds for a wide variety of purposes. They each contain at least two highly reactive epoxide groups rendering them valuable intermediates in synthesis and in a wide variety of uses where neutral compounds capable of readily combining with hydrogen halides or strong acids in general are desired. In addition, certain of the compounds have been found to possess appreciable physiological properties and to exhibit a vesicant action upon the human skin. Diglycidyl ethers of aromatic diols in which the hydroxyl groups are attached to non-adjacent carbon atoms in the ring of a unified aromatic nucleus, such as a benzene or naphthalene nucleus, were found to exhibit a pronounced tendency to react with skin, and the 1,3-diglycidyloxybenzenes have particularly unexpected physiological properties in that their vesicant action varies greatly in degree from one type of skin to another.

The following examples illustrate the detailed application of the process of the invention to the reaction between individual polyhydroxyaryl-hydrocarbons and monoxy glycerol halohydrins. However, as many variations in the individual compounds and particular reaction conditions employed are within its scope, the invention is not limited to the use of the compounds and conditions mentioned in the examples.

*Example I.—The preparation and isolation of the stereoisometric 1,4-diglycidyloxybenzenes (or, 1,4-bis(2,3-epoxypropoxy)benzenes)*

A solution of 110 g. (1 mole) of hydroquinone in 370 g. (4 moles) of epichlorohydrin was maintained at 80° C. under an atmosphere of nitrogen. While the solution was continuously stirred 80 g. (2 moles) of sodium hydroxide dissolved in 160 cc. of water was added dropwise over a period of 16 hours. The rate of addition was maintained so that the reaction mixture remained just on the neutral side as indicated by its failure to color phenolphthalein.

During the course of the reaction, two distinct layers were formed in the reaction mixture. Upon the completion of the reaction the aqueous layer was removed and the organic layer was cooled to 0° C. A crystalline precipitate formed upon the cooling of the organic layer. The precipitate was washed with water at 0° C. to remove any coprecipitated sodium chloride and dissolved in benzene. A fractional crystallization of the benzene solution produced the following isomeric compounds:

| | Grams |
|---|---|
| Melting point 118–119° C., molecular weight in benzene 218 (calculated for $C_{12}H_{14}O_4$, 222) | 50 |
| Melting point 89.5–90.5° C., molecular weight in benzene 224 | 47 |

Per cent C: Found 65.04; calculated for $C_{12}H_{14}O_4$ 64.85.

Per cent H: Found 6.21; calculated for $C_{12}H_{14}O_4$ 6.35.

and a residue of 16 g. having a melting point of 95–115° C. The yield amounted to 50.8%.

*Example II.—The effect of employing a stoichiometric equivalent of epichlorohydrin*

To illustrate the criticality of the use of an excess of the monoxy glycerol halohydrin in the present process the reaction described in Example I was repeated except that 2 moles (185 g.) of epichlorohydrin was employed rather than the 4 moles used in Example I and that 40 g. (1 mole) of sodium hydroxide dissolved in 80 cc. of water was added over the course of 10½ hours. At the end of the reaction, the reaction mixture was viscous and difficult to separate. It was found that not over a 10% yield of monomeric ethers were produced, the principal reaction products (produced in a 90% yield) being the polymers and condensation products of the ethers.

*Example III.—The preparation and isolation of the stereoisomeric 1,3-diglycidyloxybenzenes*

A solution of 110 g. (1 mole) of resorcinol in 370 g. (4 moles) of epichlorohydrin was maintained at 80° C. under an atmosphere of nitrogen. While the solution was continuously stirred 80 g. (2 moles) of sodium hydroxide dissolved in 160 cc. of water was added dropwise over a period of 10 hours. The rate of addition was maintained so that the reaction mixture remained just on the neutral side as indicated by its failure to color phenolphthalein.

The organic layer of the reaction products was separated, dried with sodium sulfate and fractionally distilled under vacuum. The stereo isomers were volatilized in the form of water white somewhat viscous liquids having the following characteristics:

| | Grams |
|---|---|
| Boiling point at 0.04 mm. 143° C., refractive index $n_D^{20}$ 1.5398 | 76.4 |
| Boiling point at 0.04 mm. 151° C., refractive index $n_D^{20}$ 1.5415 | 78.6 |

The total yield amounted to 69.8%.

*Example IV.—The preparation and isolation of stereoisometric 2,2-bis(4-glycidyloxyphenyl)-propanes*

A solution of 228 g. (1 mole) of 2,2-bis(4-hydroxyphenyl)propane in 370 g. (4 moles) of epichlorohydrin was maintained at from 105° C. to 110° C. under an atmosphere of nitrogen. While the solution was continuously stirred 80 g. (2 moles) of sodium hydroxide in the form of a 30% aqueous solution was added dropwise over a period of 16 hours. The rate of addition was maintained so that the reaction mixture remained just on the neutral side as indicated by its failure to color phenolphthalein.

The organic layer of the reaction products was separated, dried with sodium sulfate and fractionally distilled under vacuum. The stereoisomers were volatilized in the form of water white somewhat viscous liquids having the following characteristics:

| | Grams |
|---|---|
| Boiling point at 0.05 mm. 210–230° C., refractive index $n_D^{20}$ 1.5707 | 170 |
| Boiling point at 0.05 mm. 230–240° C. | 15 |

The total yield amounted to 54%.

*Example V.—The employment of dichlorohydrins in the process of the invention*

A solution of 110 g. (1 mole) of resorcinol in 650 g. (about 5 moles) of the isomeric glycerol dichlorohydrins boiling at about 180° C. when maintained at about 80° C. under an atmosphere of nitrogen and contacted with an aqueous 50% solution of sodium hydroxide amounting to about 4 moles introduced slowly with stirring so that the solution remains less alkaline than that necessary to color phenolphthalein will produce as the principal reaction product the isomeric 1,3-diglycidyloxybenzenes in the monomeric form.

The reaction products may be isolated by separating the organic layer of the reaction products from the aqueous layer, then drying, and fractionally distilling the organic layer under vacuum.

The invention claimed is:

1. A process for the poduction of 1,4-diglycidyloxybenzene which comprises maintaining at a temperature of from 50° C. to 110° C. a solution of hydroquinone in from 4 to 6 times as many moles of epichlorohydrin and introducing substantially 2 moles of an alkali metal hydroxide for each mole of hydroquinone under an oxygen-free atmosphere and at a rate causing the solution to remain at an alkalinity of less than that which colors phenolphthalein.

2. A process for the production of 1,3-diglycidyloxybenzene which comprises maintaining at a temperature of from 50° C. to 110° C. a solution of resorcinol in from 4 to 6 times as many moles of epichlorohydrin and introducing substantially 2 moles of an alkali metal hydroxide for each mole of resorcinol under an oxygen-free atmosphere and at a rate causing the solution to remain at an alkalinity of less than that which colors phenolphthalein.

3. A process for the production of 2,2-bis(4-glycidyloxyphenyl)-propane which comprises maintaining at a temperature of from 50° C. to 110° C. a solution of 2,2-bis(4-hydroxyphenyl)-propane in from 4 to 6 times as many moles of epichlorohydrin and introducing 2 moles of an alkali metal hydroxide for each mole of 2,2-bis(4-hydroxyphenyl)propane under an oxygen-free atmosphere and at a rate causing the solution to remain at an alkalinity of less than that which colors phenolphthalein.

4. A process for the production of a monomeric glycidyl polyether of a polyhydric aromatic alcohol which comprises maintaining at a temperature of from 20° C. to 120° C. a solution of a hydrocarbon containing at least one benzene ring and at least two substituent hydroxyl groups attached to non-adjacent carbon atoms in the rings in from 2 to 3 times the amount of epichlorohydrin required to attach a glycidyl radical to each hydroxyl group, and introducing the amount of an inorganic alkaline reacting compound required to substantially neutralize the hydrogen chloride released in such attachment under an oxygen-free atmosphere and in a manner causing the solution to remain at an alkalinity of less than that coloring phenolphthalein.

5. In a process of producing the product of a reaction in alkaline solution between an aromatic hydrocarbon containing not more than two uncondensed benzene rings and containing two substituent hydroxyl groups attached to non-adjacent carbon atoms in the rings and a monoxy glycerol chlorohydrin, the improvement leading to the production of monomeric compounds as the principal reaction product which comprises, employing from 4 to 6 moles of the monoxy glycerol chlorohydrin to 1 mole of the hydroxyaryl compound and introducing the amount of an alkali metal hydroxide required to substantially neutralize the hydrogen chloride released in the attachment of a glycidyl radical to the oxygen atom of each hydroxy group of the hydroxyaryl compound under an oxygen-free atmosphere and at such a rate that the alkalinity of the solution remains less than that coloring phenolphthalein while maintaining the mixed reactants at a temperature of from 20° C. to 120° C.

6. A process for the production of a diglycidyl ether of an aromatic hydrocarbon containing not more than two uncondensed benzene rings and containing two substituent hydroxyl groups attached to non-adjacent carbon atoms in the rings which comprises maintaining at a temperature of from 20° C. to 120° C. a solution of the hydroxyaryl compound in an amount of a monoxy glycerol chlorohydrin which is from 2 to 3 times the amount required to attach a glycidyl radical to the oxygen atom of each hydroxyl group of the aromatic compound, and introducing the amount of an alkali metal hydroxide required to neutralize the hydrogen chloride liberated in such attachment said introduction being conducted in an oxygen-free atmosphere and at such a rate that the solution remains less alkaline than the alkalinity which colors phenolphthalein.

7. In a process for producing the product of the reaction in alkaline solution between an aromatic compound which is a hydrocarbon containing at least one benzene ring and containing at least two substituent hydroxyl groups attached to non-adjacent carbon atoms in the rings and a monoxy glycerol halohydrin, the improvement leading to the production of monomeric compounds as the principal product which comprises, employing from 2 to 3 times the amount of halohydrin required to attach a glycidyl radical to the oxygen atom of each hydroxyl group of the aromatic compound, and introducing the amount of an alkaline reacting compound required to neutralize the hydrogen halide released by such attachment at a rate which causes the solution to remain at an alkalinity of less than that causing phenolphthalein to become colored while maintaining the mixed reactants at a temperature of from 20° C. to 120° C.

8. A process for the production of a monomeric epoxyalkylaryl polyether which comprises maintaining at a temperature of from 20° C. to 120° C. a solution of a polyhydroxyaryl-hydrocarbon containing at least one benzene ring and at least two hydroxyl groups attached to non-adjacent ring carbon atoms in an amount of a monoxy glycerol halohydrin which corresponds to at least 2 times the number of moles of polyhydroxyaryl-hydrocarbon multiplied by the number of hydroxyl groups it contains and adding to the solution the amount of an inorganic alkaline reacting compound required to substantially neutralize the amount of hydrogen halide released by the attachment of a glycidyl radical to the oxygen atom of each hydroxyl group of the polyhydroxyarylhydrocarbon.

ERNEST GEORGE GERMAIN WERNER.
EVERT FARENHORST.

REFERENCES CITED

The following references are of record in the file of this patent:

UNITED STATES PATENTS

| Number | Name | Date |
|---|---|---|
| 2,067,960 | Wertz | Jan. 19, 1937 |
| 2,324,483 | Castan | July 20, 1943 |
| 2,371,500 | Britton | Mar. 13, 1945 |

FOREIGN PATENTS

| Number | Country | Date |
|---|---|---|
| 557,513 | Great Britain | Nov. 24, 1943 |